(12) United States Patent
Griffith et al.

(10) Patent No.: US 6,591,392 B1
(45) Date of Patent: Jul. 8, 2003

(54) COMPACT DISC SUBCODE PACKING AND ERROR CORRECTION DETECTION

(75) Inventors: Robert R. Griffith, San Jose, CA (US); Gene E. Weddle, San Jose, CA (US); Zongzhao Fei, San Jose, CA (US)

(73) Assignee: Oak Technology, Inc., Sunnyvale, CA (US)

(*) Notice: Subject to any disclaimer, the term of this patent is extended or adjusted under 35 U.S.C. 154(b) by 0 days.

(21) Appl. No.: 09/449,014

(22) Filed: Nov. 24, 1999

(51) Int. Cl.[7] ............... G11C 29/00; G11B 21/12; G11B 21/18
(52) U.S. Cl. ........................... 714/763; 369/32
(58) Field of Search ................ 714/701, 746, 714/752, 763–769, 770, 771, 799, 800; 369/32.01, 53.31, 53.32, 53.33, 53.35

(56) References Cited

U.S. PATENT DOCUMENTS

| 4,994,925 A | 2/1991 | Yamashita et al. ......... 358/343 |
| 4,996,679 A | 2/1991 | Yoshio .................. 369/33 |
| 5,226,046 A | 7/1993 | Hanson ................. 370/105.4 |
| 5,249,166 A | 9/1993 | Hamilton et al. ........... 369/32 |
| 5,397,853 A | 3/1995 | Koguchi ................... 84/609 |
| 5,508,983 A | 4/1996 | Nakamura et al. ........... 369/32 |
| 5,818,801 A | 10/1998 | Watanabe et al. ........... 369/33 |
| 6,430,127 B1 * | 8/2002 | Tsukihashi ............. 369/47.33 |

* cited by examiner

Primary Examiner—Christine T. Tu
(74) Attorney, Agent, or Firm—Martine & Penilla, LLP (57) ABSTRACT

A subcode processing circuit of an optical disc drive, and a method for processing subcode data are disclosed. The subcode processing circuit includes a shift register circuit for processing a plurality of standard subcode data bytes that are obtained from an optical disc media of the optical disc drive. The processing is configured to pack the plurality of standard subcode data bytes into a plurality of packed subcode data bytes. The plurality of packed subcode data bytes is configured to be less than the plurality of standard subcode data bytes. In one example, the shift register circuit is configured to include a plurality of shift registers and a multiplexer to assist in the processing. The subcode processing circuit is further configured to perform error correction for each byte of the plurality of packed subcode data bytes.

22 Claims, 9 Drawing Sheets

STATE 0: Dummy write to buffer. No valid data is written, and no CRC is performed.

STATE 1: Write subcode byte R(n), S(n),T(n), U(n), V(n), W(n), R(n+1), S(n+1). Overwrite data written in State 0.

STATE 2: Write subcode byte T(n), U(n), V(n), W(n), R(n+1), S(n+1), T(n+1), U(n+1).

STATE 3: Write subcode byte V(n), W(n), R(n+1), S(n+1), T(n+1), U(n+1), V(n+1), W(n+1).

n = subcode frame number - 2

*Fig. 5B*

COMPACT DISC SUBCODE PACKING AND ERROR CORRECTION DETECTION

BACKGROUND OF THE INVENTION

1. Field of the Invention

The present invention relates generally to digital data processing and more particularly to efficient processing of subcode data in optical disc applications.

2. Description of the Related Art

Figure 1A:
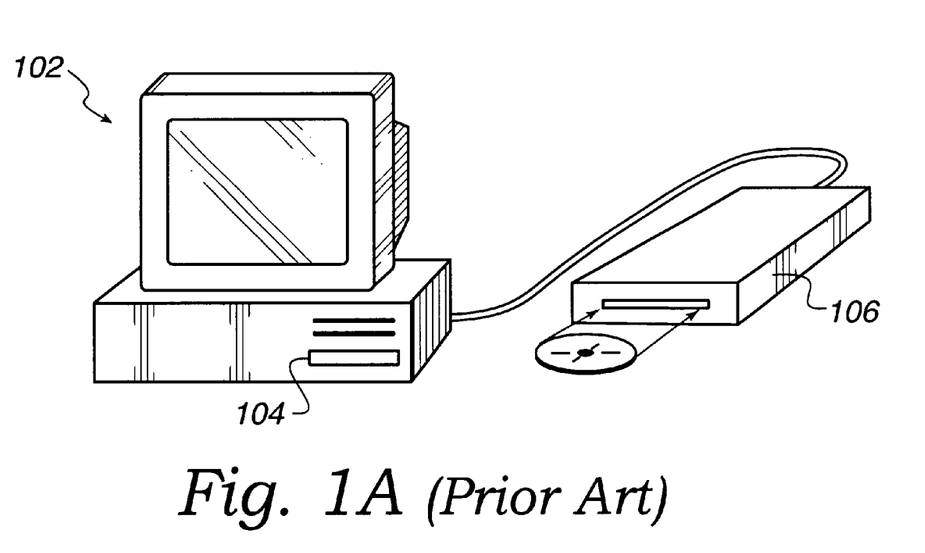
FIG. 1A illustrates a simple prior art computer system diagram.

In recent years, computer equipment accessible to average consumers has increased dramatically in processing power, flexibility of configuration, and ease of use. Although it is desirable to have powerful computer equipment, as consumer devices become more powerful, consumers have become accustomed of demanding more from their computer peripheral devices. Computer peripheral devices typically include a computer's hard drive, floppy disk, compact disc player (CD-ROM), compact disc recordable (CD-R), compact disc rewritable (CD-RW), digital video disc (DVD), and the like. For example, FIG. 1A illustrates a computer system 102 that has both internal and external peripheral devices. The devices in this example can include an internal CD-ROM drive 104 and an external CD-R or CD-RW drive 106. The drives 104 and 106 can then be connected to the motherboard of the computer by way of well known IDE connections, SCSI connections, or USB connections.

Figure 1B:
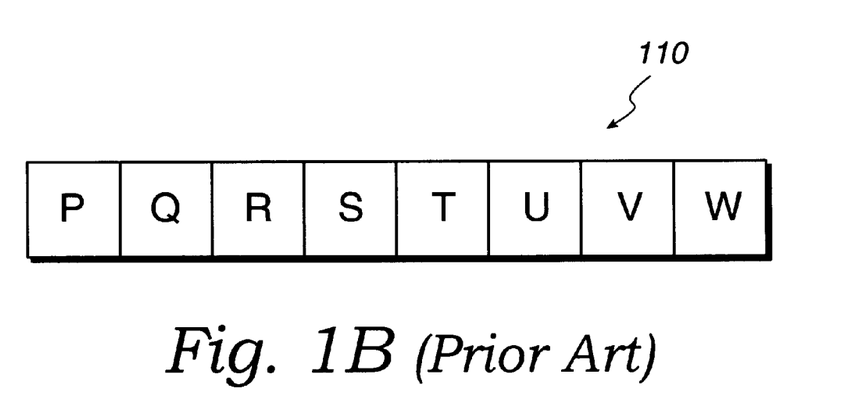
FIG. 1B illustrates a standard prior art subcode byte, including subcode bits P–W.

In regard to compact discs (e.g., CD-ROMs, CD-Rs, and CD-RWs), the data is arranged on the media in sectors that spiral around the disc. Each sector typically has what is called subcode data that is interleaved throughout the sector. FIG. 1B illustrates an exemplary standard byte of subcode data 110. In practice, each sector will include 98 subcode bytes, and each standard byte of subcode data 110 includes bits P, Q, R, S, T, U, V, and W. Therefore, each sector will have 98 bits of P-subcode, 98 bits of Q-subcode, 98 bits of R-subcode, 98 bits of S-subcode, 98 bits of T-subcode, 98 bits of U-subcode, 98 bits of V-subcode, and 98 bits of W-subcode. The first two bytes of subcode contain no information, and only 96 bytes are used. As is well known, each of these subcode bits may be used for a number of identification purposes, such as video data, text data, and the like. The P-subcode bits are typically used to indicate the start of a track. The 98 bits of Q-subcode are used to ascertain an absolute MSF (minutes, seconds, frames) of a particular sector, or for other processing and/or identification purposes.

For some applications, the electronics, firmware and associated software of an optical disc drive will read the entire subcode data and then transfer it to the host for further processing. However, it is often the case that not all of the subcode data is needed by the host to complete the desired processing. For instance, when CD-text is processed by way of the subcode data, subcode bits P and Q are never of interest. Thus, only subcode bits R through W in actuality will be examined and processed by the host. However, conventional processing will require that all subcode bits P through W be processed by the optical disc drive and then be transferred to the host. Additionally, the firmware or software of the optical disc drive is generally required to perform a cyclic redundancy checksum (CRC) on the subcode data before being transferred to the host.

Although the processing speeds of host computer systems continue to increase, the host will necessarily be delayed in its processing because it must wait unit it has received all 98 correct bytes of subcode data for each sector before it can begin processing the subcode data of interest. This delay can cause consumers to become impatient or dissatisfied with peripheral devices that slow down processing operations, thus reducing the marketability of such devices. Also, some host applications require this subcode processing to be performed by the optical drive rather than by host software.

In view of the foregoing, there is a need for optical disc drive circuitry that can efficiently pre-process and error correct subcode data to avoid the handling of unimportant subcode bits. There is also a need for hardware implementations for efficiently packing important subcode data in order to increase transfer rate efficiently between an optical disc drive and its host.

SUMMARY OF THE INVENTION

Broadly speaking, the present invention provides circuitry and methods for efficiently processing subcode data read from an optical disc media. It should be appreciated that the present invention can be implemented in numerous ways, including as a process, an apparatus, a system, a device, a method, or a computer readable medium. Several inventive embodiments of the present invention are described below.

In one embodiment, a subcode processing circuit of an optical disc drive is disclosed. The subcode processing circuit includes a shift register circuit for processing a plurality of standard subcode data bytes that are obtained from an optical disc media of the optical disc drive. The processing is configured to pack the plurality of standard subcode data bytes into a plurality of packed subcode data bytes. In this embodiment, the plurality of packed subcode data bytes is configured to be less than the plurality of standard subcode data bytes. In addition, the shift register circuit is configured to include a plurality of shift registers and a multiplexer to assist in the processing.

In another embodiment, a method for processing subcode data retrieved from a compact disc media is disclosed. The method includes receiving a plurality of standard subcode data bytes and processing the plurality of standard subcode data bytes to generate a plurality of packed subcode data bytes. The plurality of packed subcode data bytes is configured to be fewer than the plurality of standard subcode data bytes. In this embodiment, the processing further includes examining each byte of the plurality of standard subcode data bytes to eliminate selected subcode bits and packing remaining bytes not eliminated during the examining to define the plurality of packed subcode data bytes.

In yet another embodiment, a computer readable media having program instructions for processing subcode data retrieved from an optical disc media is disclosed. The computer readable media includes program instructions for receiving a plurality of standard subcode data bytes and for processing the plurality of standard subcode data bytes to generate a plurality of packed subcode data bytes. The plurality of packed subcode data bytes are configured to be fewer than the plurality of standard subcode data bytes. The program instructions for processing further includes instructions for examining each byte of the plurality of standard subcode data bytes to eliminate selected subcode bits, and instructions for packing remaining bytes not eliminated during the examining process to define the plurality of packed subcode data bytes.

Advantageously, the embodiments of the present invention provide for more efficient processing of subcode data read from an optical disc media. Because the subcode data can include bits that are not of interest for a particular application, such as CD-TEXT applications, it is more efficient to discard subcode bits that are not of interest before transferring the subcode data to the host. In addition, the embodiments of the present invention provide for efficient error correction operations on processed subcode data bytes after the certain bits have been discarded. In one specific example, the subcode bits that are not of interest may be the P and Q subcode bits. The processing of the subcode bits is configured to pack 96 bytes of standard subcode data into 72 bytes of packed subcode data, without losing any of the bits of interest form all 96 bytes.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, in which like reference numerals designate like structural elements.

DETAILED DESCRIPTION OF THE INVENTION

In accordance with the invention, subcode data is processed to eliminate subcode bits that are not of interest. The desired subcode data read from an optical disc media is packed into a more compact arrangement, and error detection is performed on the packed subcode data. It will be obvious, to one skilled in the art, that the present invention may be practiced without some or all of these specific details. In other instances, well-known process operations have not been described in detail in order not to unnecessarily obscure the present invention.

Figure 2:
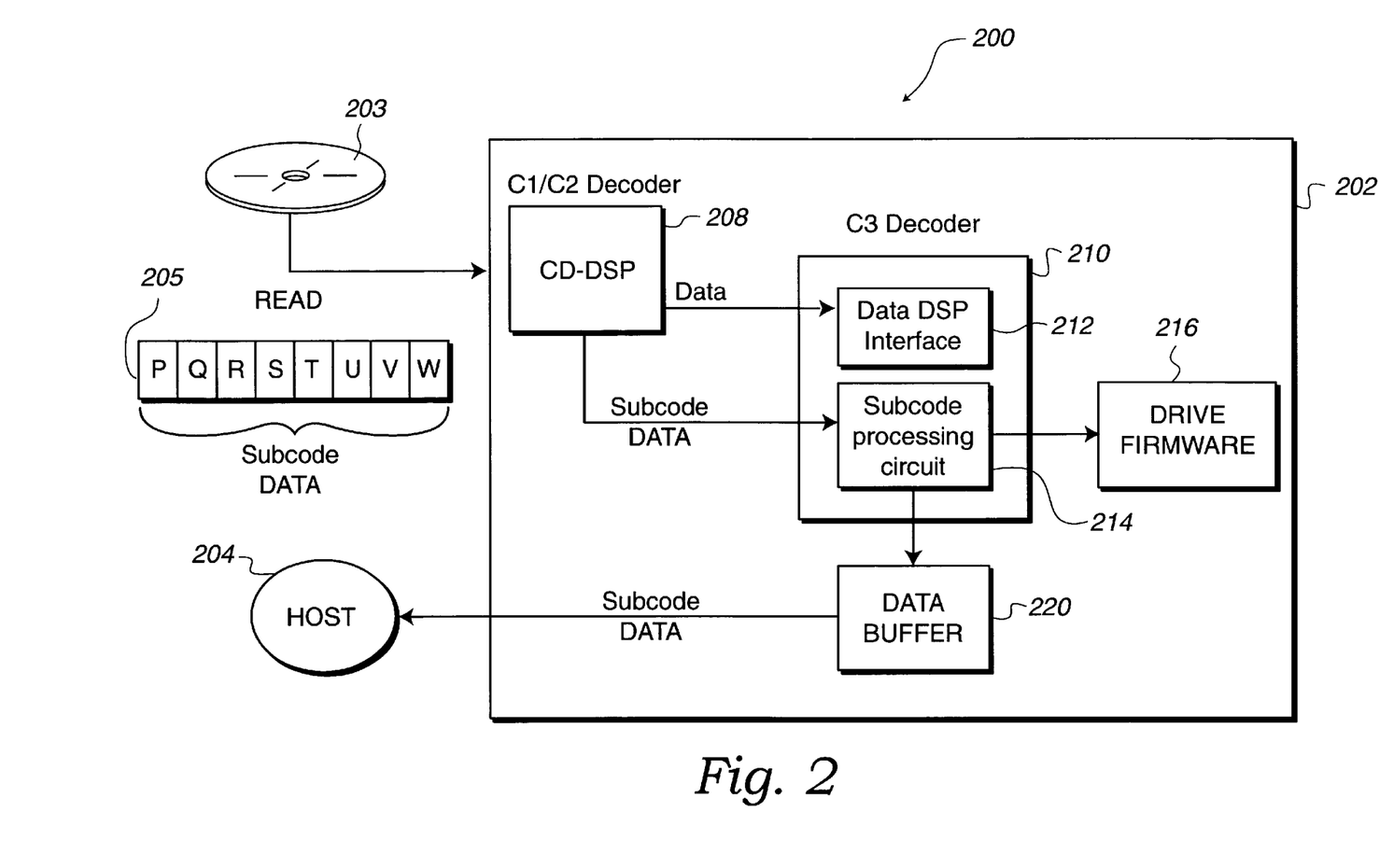
FIG. 2 illustrates an optical disc system, including optical disc circuitry, and a compact disc media, in accordance with one embodiment of the present invention.

FIG. 2 illustrates an optical disc system 200, including optical disc circuitry 202, and a compact disc media 203, in accordance with one embodiment of the present invention. The optical disc system 200 is shown in communication with a host 204. In practice, the optical disc system 200 can include additional well known circuitry for defining a desired optical disc peripheral device. Exemplary optical disc peripheral devices may include, CD-ROMs, CD-Rs, CD-RWs, DVDs, etc. The optical disc media 203 would therefore be able to be inserted or removed from the particular optical disc peripheral device. For ease of understanding the features of the present invention, the following discussion will focus on the processing of subcode data 205 that may be read from the compact disc media 203. As described above, each sector will include, among other things, 96 bytes of useful subcode data (e.g., because the first 2 bytes are typically discarded) and regular sector data (i.e., such as the audio data, digital file data, and the like).

As both subcode data and regular sector data are transferred to a CD-DSP controller 208 (C1/C2 decoder) of the optical disc circuitry 202, the CD-DSP 208 will perform well known C1/C2 decoding on the regular sector data. The regular sector data is then passed by the CD-DSP controller 208 to a data interface 212 within a C3 decoder 210. The subcode data is likewise separated and transferred to a subcode processing circuit 214. In one embodiment of the present invention, the subcode processing circuit 214 is configured to intelligently pack particular bits of the subcode data 205 into a more compact arrangement. The subcode processing circuit will then perform CRC calculations on each byte of intelligently packed subcode data. The subcode processing circuit 214 will thus communicate results of the CRC processing to the drive firmware 216 to alert the optical disc circuitry 202 as to whether or not there was an error associated with the process subcode data. If the subcode data that was intelligently packed into a more compact arrangement in subcode processing circuit 214 is correct, the data is passed to a data buffer 220 for communication to the host 204. In one embodiment, the buffer 220 can be a RAM or any other suitable storage device.

Figure 3A:
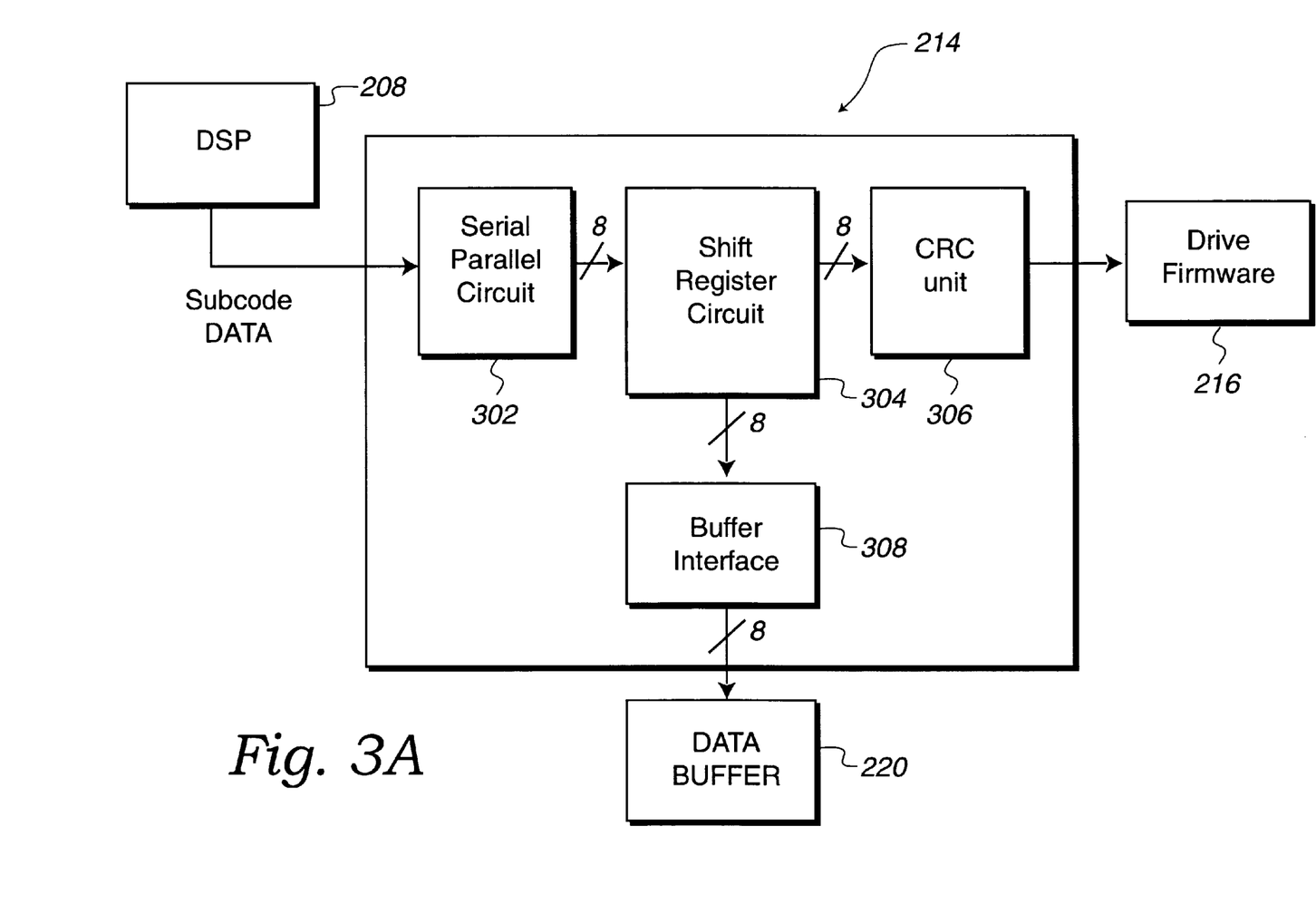
FIG. 3A illustrates a more detailed block diagram of the subcode processing circuit in which the received subcode data from the DSP is processed, in accordance with one embodiment of the present invention.

FIG. 3A illustrates a more detailed block diagram of the subcode processing circuit 214 in which the received subcode data from the CD-DSP 208 is processed, in accordance with one embodiment of the present invention. Initially, 8 bits of subcode data (i.e., bits P through W) are transferred to a serial-to-parallel circuit 302. The serial-to-parallel circuit 302 is configured to transform the received serial bits into a parallel byte that can be transferred to a shift register circuit 304. Shift register circuit 304 is configured to examine the received subcode data and discard all P and Q subcode bits before intelligently packing 8 bits of subcode data of interest (i.e., subcode bits R–W only) and performing cyclic redundancy checksums in a CRC unit 306 of the subcode processing unit 214.

As 8 bits of subcode data of interest are packed in the shift register circuit 304, those 8 bits are processed through the CRC unit 306 and then transferred to the buffer interface 308. If it is determined that the integrity of the subcode data is in order, the packed subcode data is transferred to a data buffer 220 of the optical disc circuitry 202. Once the data buffer 220 has collected the relevant subcode bits (i.e., bits R–W) for 96 bytes of subcode, the intelligently packed subcode data is transferred to the host 204. As will be described in greater detail below because the shift register circuit 304 is configured to discard bits P and Q, it is possible to pack four bytes of original standard subcode data (i.e., P through W) in the space of three bytes of packed subcode data (i.e., R through W).

As a result, for 96 bytes of usable original subcode data per sector that includes subcode bits P through W, it will now be possible to convert the 96 bytes into 72 bytes of subcode data. It should be noted that this packing is performed without losing any relevant R through W subcode data for all 96 original subcode bytes. Advantageously, the data buffer 220 will only have to transfer 72 bytes of subcode data to the host instead of 96 bytes of subcode data, and therefore, the host will not have to process 96 bits of P-subcode and 96 bits of Q-subcode. As can be appreciated, the subcode data transfer from the optical disc system 200 to the host 204 will amount to more efficient data transfer and more efficient processing by the host 204.

Figure 3B:
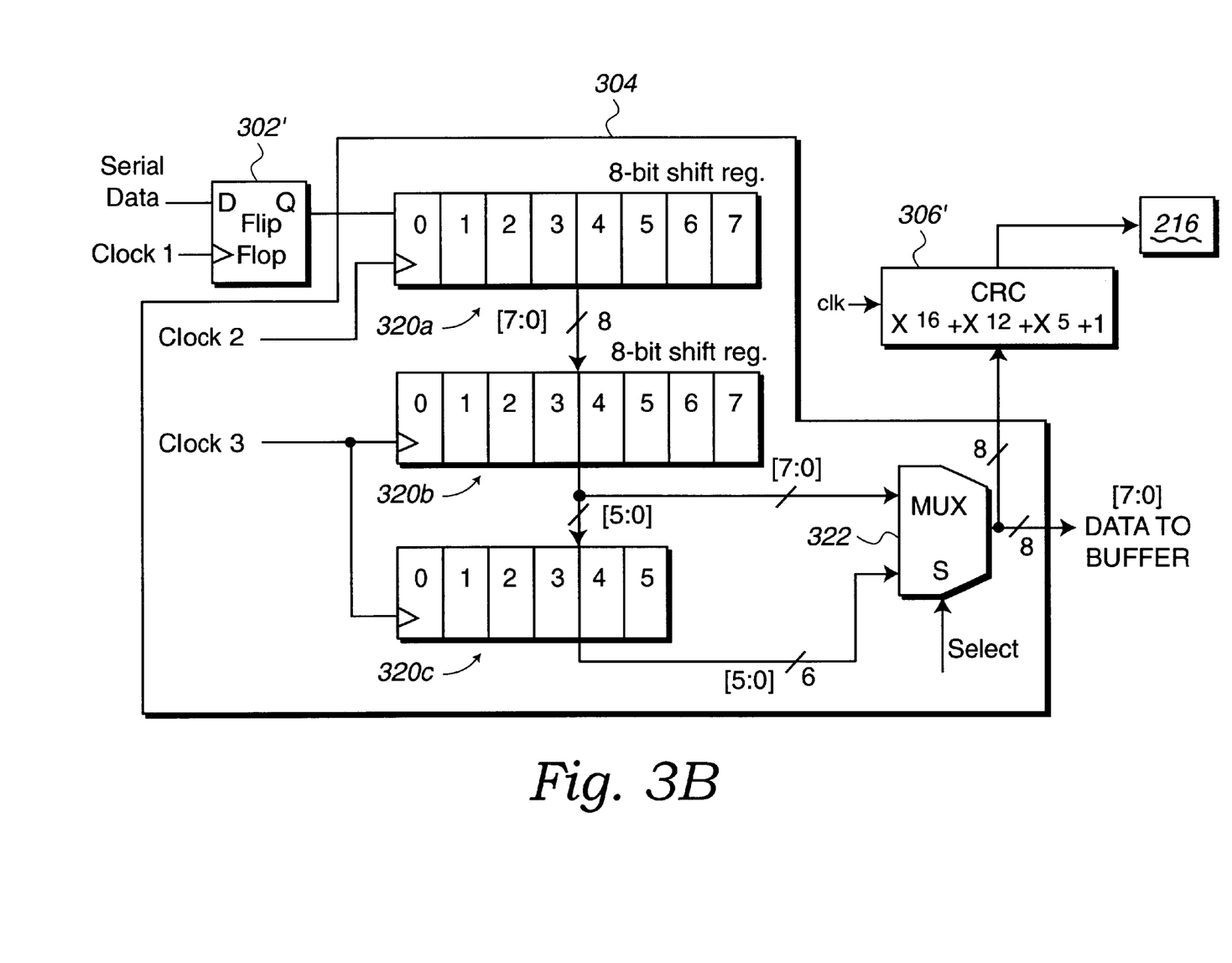
FIG. 3B illustrates a more detailed block diagram of the shift register circuit of FIG. 3A, in accordance with one embodiment of the present invention.

FIG. 3B illustrates a more detailed block diagram of the shift register circuit 304, in accordance with one embodiment of the present invention. The shift register circuit 304 includes a first 8-bit shift register 320a, a second 8-bit shift register 320b, and a 6-bit shift register 320c. Shift registers 320a–c are then implemented to intelligently discard the P and Q subcode bits and then pack the desired subcode bits R through W in packed arrangements of 8 bits.

In one embodiment, serial subcode data is first introduced into a flip-flop 302' which is controlled by a clock$_1$. When clock$_1$ triggers the flip-flop 302', the serial subcode data is transferred to the first 8-bit shift register 320a. The subcode data shifted into the first 8-bit shift register 320a is then shifted into the second 8-bit shift register 320b as the first 8-bit shift register 320a receives the next byte of subcode data P through W. When the third byte of subcode data is transferred into the first 8-bit shift register 320a, the contents of the first 8-bit shift register 320a, and the second 8-bit shift register 320b are shifted downward to enable the new byte of subcode data to be stored in the first 8-bit shift register 320a. Thus, the subcode data that was stored in the second 8-bit shift register 320b is transferred to the 6-bit shift register 320c. However, only subcode bits R through W are transferred to the 6-bit shift register 320c, thus discarding the P and the Q subcode bits. A clock$_2$ and a clock$_3$ are used to appropriately shift data into the respective shift registers.

A multiplexor 322 is used to intelligently select the correct R through W subcode bits from either the second 8-bit shift register 320b and/or the 6-bit shift register 320c. The operation of the shift register circuit 304 will be described in greater detail below with reference to FIGS. 4A through 4E. However, the shift register circuit 304 is configured to transfer each 8 bits of packed subcode data to both a CRC unit 306' that is controlled by a clock (clk) and to the buffer interface 308. Once the CRC operation is performed on the 8 bits of packed subcode data, the CRC unit 306 communicates to the drive firmware 216 to indicate whether the subcode bits have the appropriate integrity. In one embodiment, the CRC operation implements a well known CRC polynomial $X_{16}+X_{12}+X_5+1$. It should be noted, however, that for each valid 8 bits of packed subcode data (i.e., subcode data only including bits R through W), all 8 bits are transferred to both the CRC unit 306 and to the buffer interface 308.

Figure 4A:
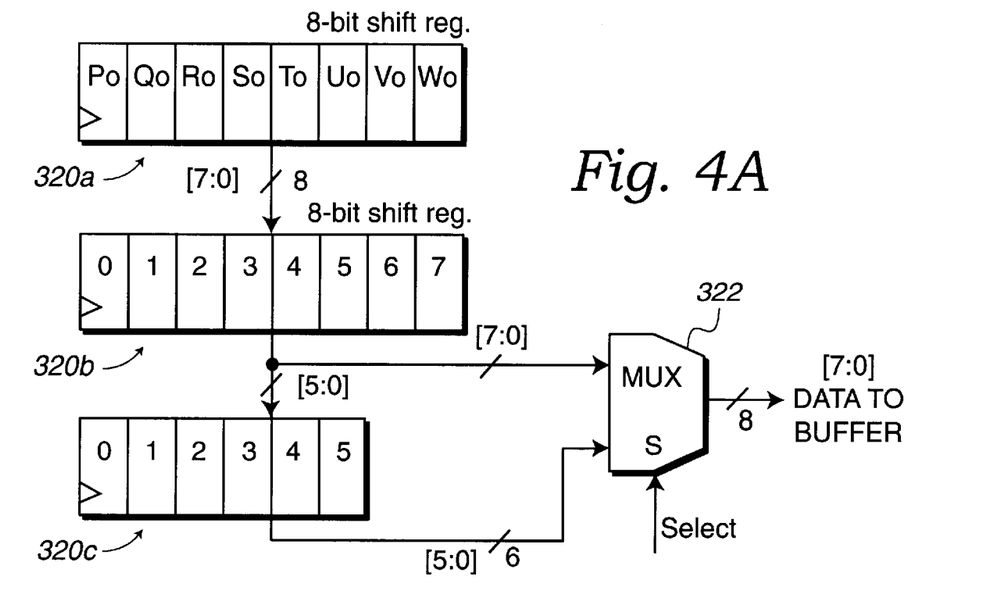
FIGS. 4A–4E illustrate exemplary process operations performed when standard subcode data bytes are shifted through a plurality of shift registers, in accordance with one embodiment of the present invention.
Figure 4B:
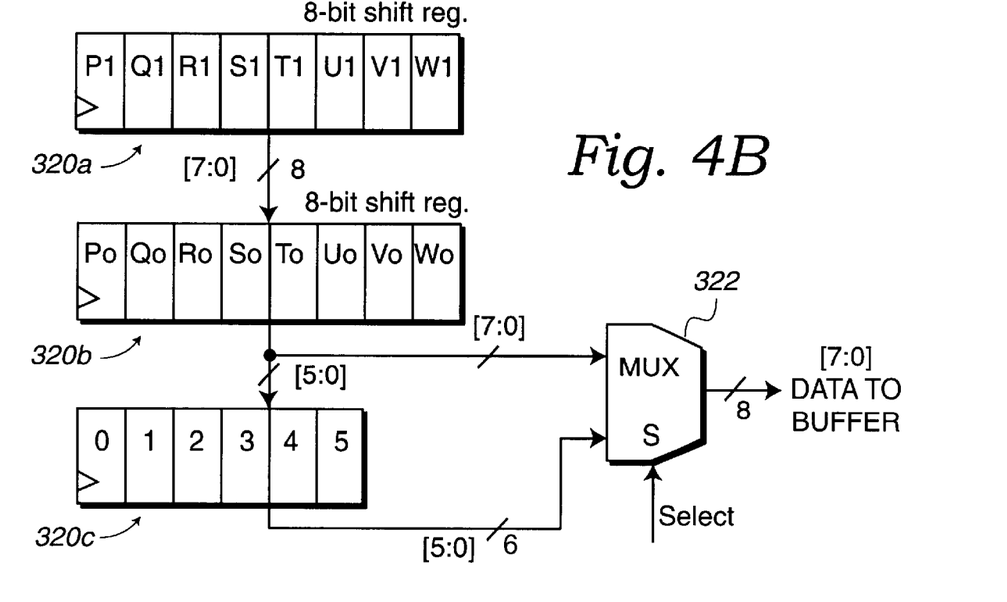
Figure 4C:
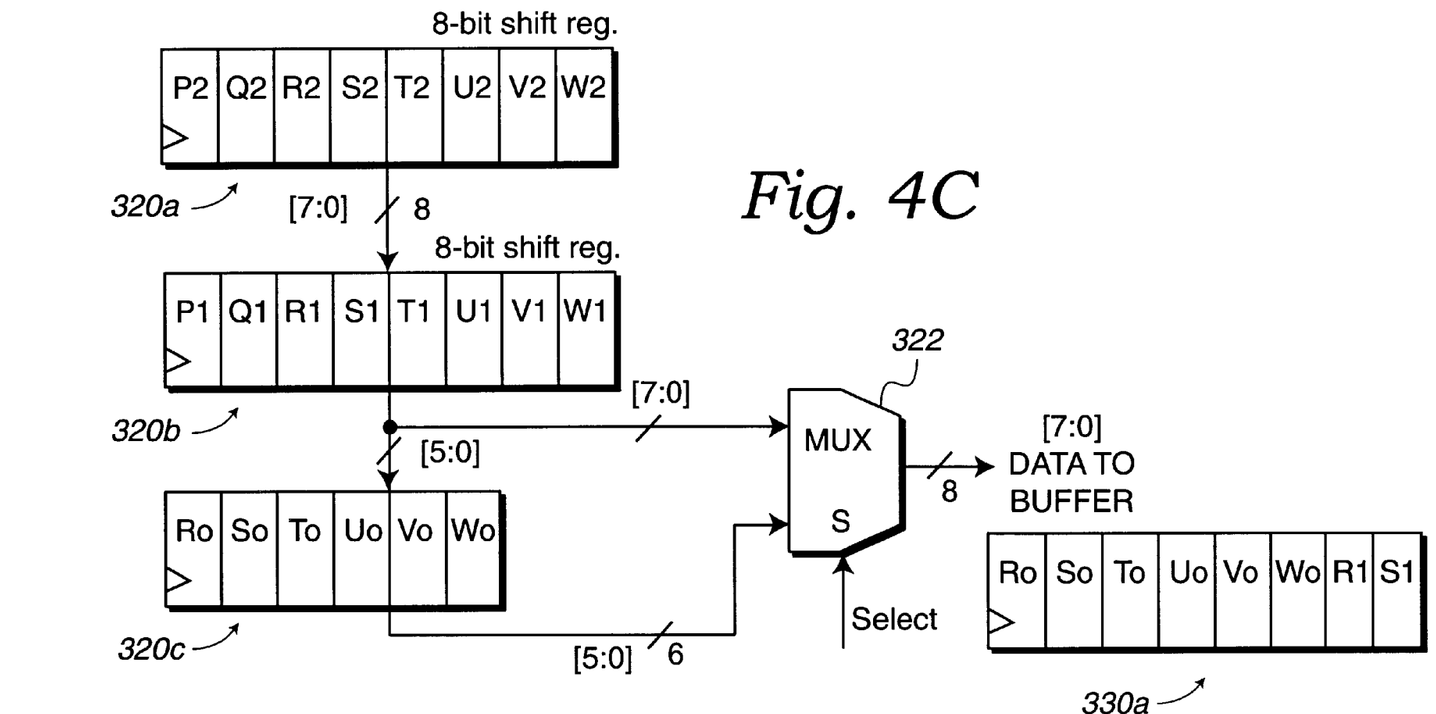

FIG. 4A illustrates the operation of shifting in 8 bits of subcode data $P_0$ through $W_0$ into the first 8-bit shift register 320a. In the next operation shown in FIG. 4B, another byte of subcode data is shifted into the first 8-bit shift register 320a including subcode data $P_1$ through $W_1$. The subcode data previously resident in the first shift register 320a is shifted to the second 8-bit shift register 320b as shown in FIG. 4B. In FIG. 4C, the next byte of subcode data $P_2$ through $W_2$ is shifted into the first 8-bit shift register 320a, the subcode data $P_1$ through $W_1$ is shifted into the second 8-bit shift register 320b, and subcode bits $R_0$ through $W_0$ are shifted into the 6-bit shift register 320c.

Figure 4D:
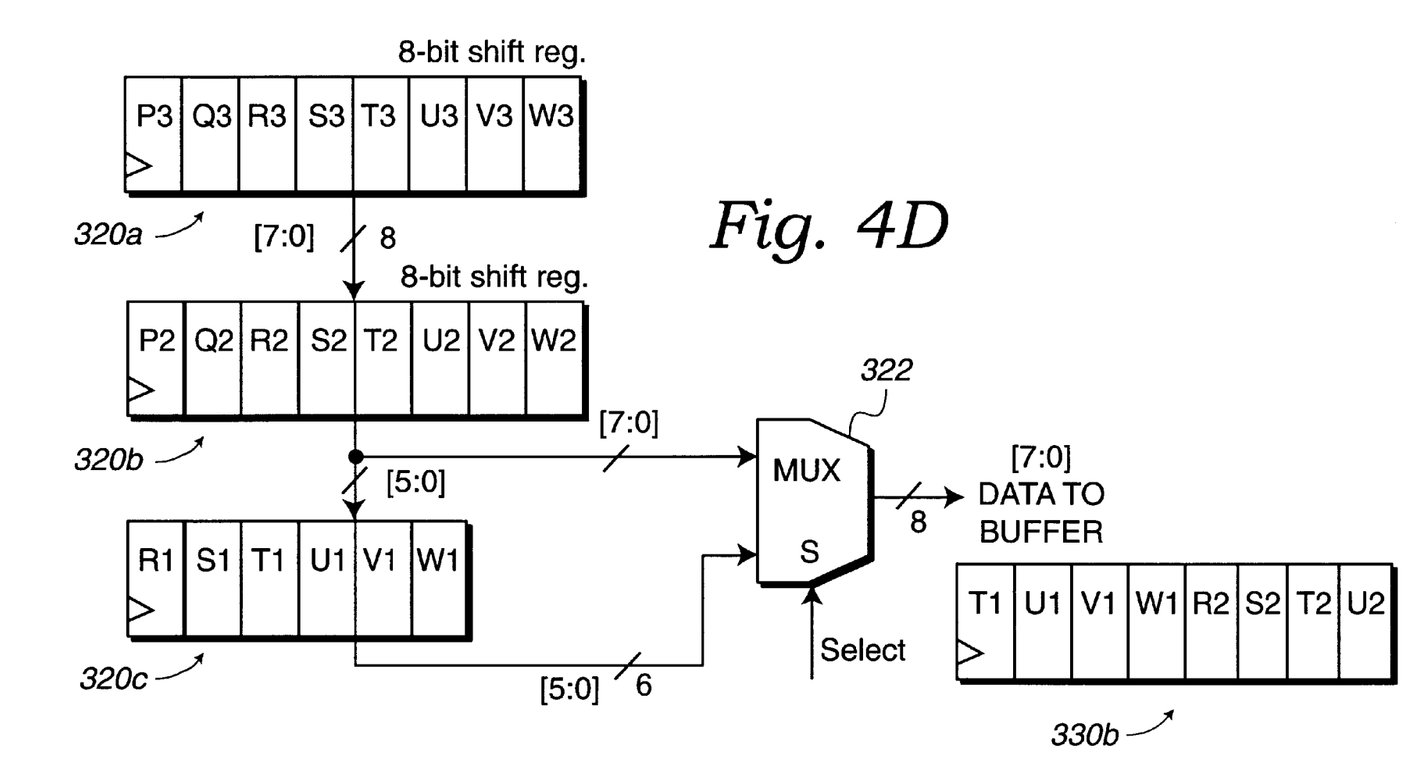
Figure 4E:
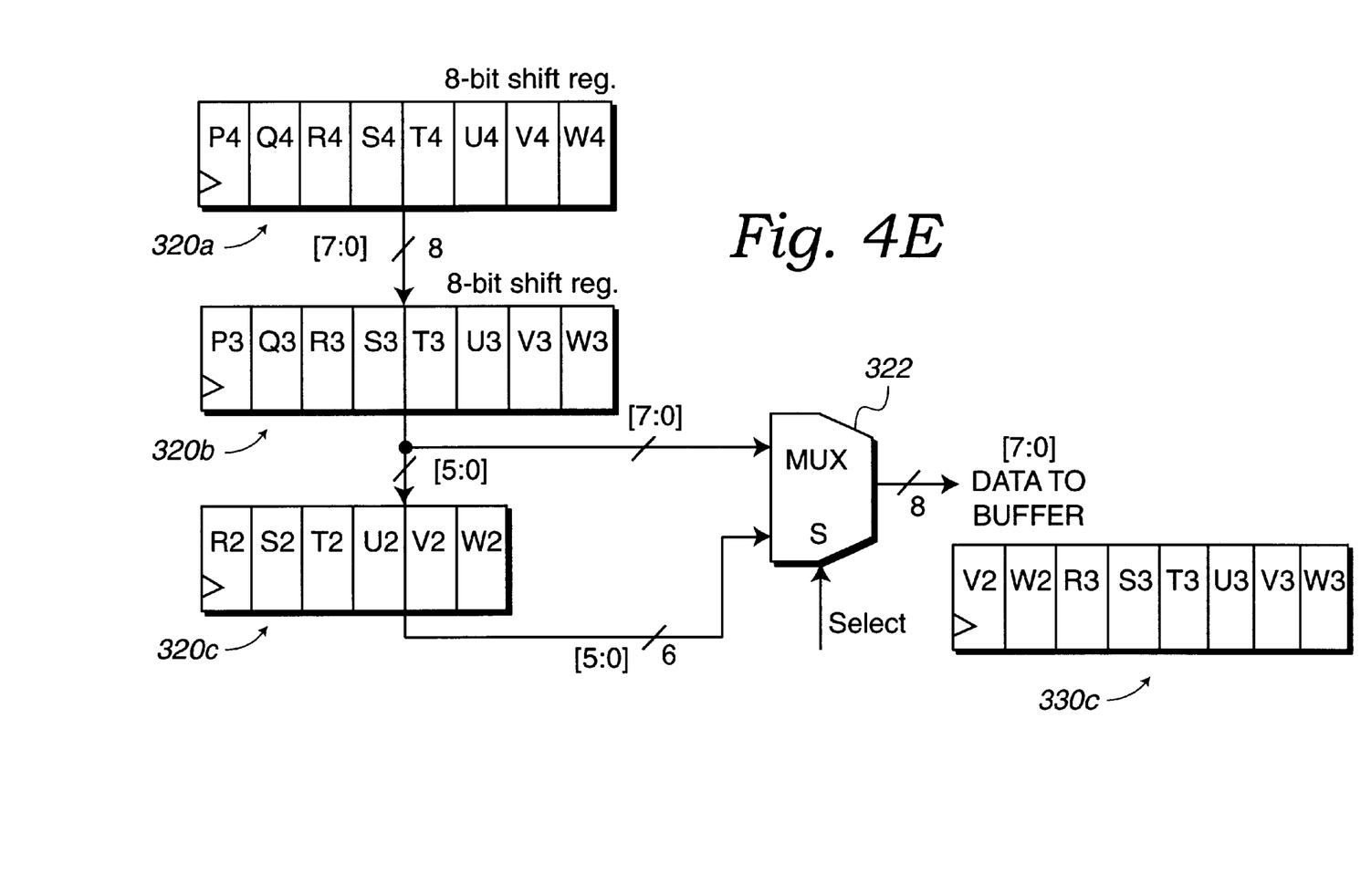

At this point, the multiplexer 322 will enable the selection of subcode data $R_0$ through $W_0$, and $R_1$ and $S_1$. These 8 bits therefore define a packed byte of subcode data 330a in accordance with one embodiment of the present invention. In FIG. 4D, it is shown that the subcode data previously resident in the first 8-bit shift register 320a is shifted into the second 8-bit shift register 320b to enable subcode data $P_3$ through $W_3$ to be shifted into the first 8-bit shift register 320a. At the same time, bits R1 through W1 are shifted into the 6-bit shift register 320c from their previous location in the second 8-bit shift register 320b.

The multiplexer 322 will then be configured to select subcode data $T_1$ through $W_1$ from the 6-bit shift register 320c, and $R_2$ through $U_2$ from the second 8-bit shift register 320b, to produce a packed byte of subcode data 330b. The process then continues to where a next byte of subcode data $P_4$ through $W_4$ is shifted into the first 8-bit shift register 320a in FIG. 4E. This causes the data to be shifted downward to the second 8-bit shift register 320b and the 6-bit shift register 320c as illustrated. The multiplexer 322 will then intelligently select subcode data $V_2$ through $W_2$ from the 6-bit shift register 320c, and $R_3$ through $W_3$ from the second 8-bit shift register 320b, to produce a packed byte of subcode data 330c.

It should be clear that 4 bytes of subcode data that include subcode bits P through W can be packed into 3 bytes of intelligently packed subcode data that include bits R through W without the need for processing bits P and Q. Because 4 bytes of subcode data can now be packed into 3 bytes, it is possible to convert the 96 bytes of subcode data for each sector read from the compact disc media 203 into 72 bytes of packed subcode data. Each time a byte is ready, it is transferred to the data buffer 220. When 72 packed bytes are ready in the data buffer 220, the 72 bytes are transferred to the host 204. Because fewer bytes need to be transferred from the data buffer 220 to the host 204, a more efficient transfer of subcode data can be made to the host for processing (i.e., without the need for transferring the P and the Q subcode bits).

It is also important to note that each time a packed byte of subcode data 330a, 330b, 330c, etc., are generated by the shift register circuit 304, each one of the packed bytes of subcode data 330 are passed to the CRC unit 306 to verify the subcode data integrity. Accordingly, although only 4 bytes are shown processed through the shift register circuit 304 to produce 3 bytes of packed subcode data 330, it should be apparent that the process continues until all 96 bytes of subcode data (P through W) of a particular sector are processed through the shift register circuit to produce 72 bytes of packed subcode data 330.

Figure 5A:
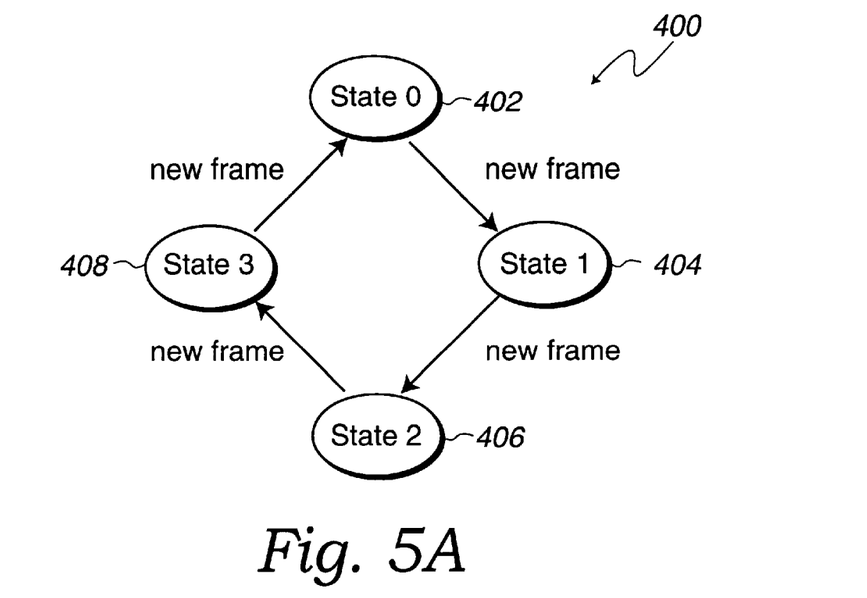
FIG. 5A shows a state machine that defines the operations performed by the shift register circuit of FIG. 3A, in accordance with one embodiment of the present invention.

FIG. 5A shows a state machine 400 that defines the operations performed by the shift register circuit 304 of FIG. 3A, in accordance with one embodiment of the present invention. The state machine diagram 400 begins at 402 where a state-0 is defined for receiving a first subcode byte. As defined in table 450 of FIG. 5B, in state-0, a dummy write to the data buffer 220 is performed, and no valid data is written. From state-0, the state machine 400 moves to state-1 404 where subcode bytes R (n) through S (n+1) are written to the data buffer 220. For instance, the subcode data written to the data buffer 220 in state-1 is essentially the packed byte of subcode data 330a of FIG. 4C.

Figure 5B:
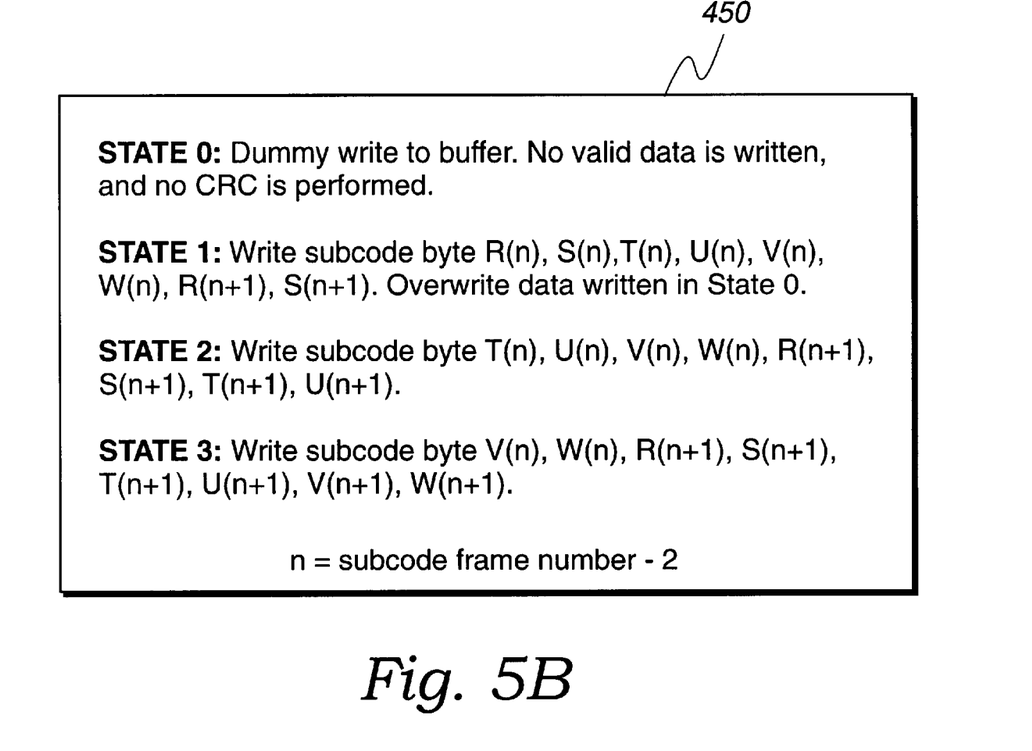
FIG. 5B shows a table that defines the exemplary processing states of the state machine of FIG. 5A, in accordance with one embodiment of the present invention.

From state-1 404, the state machine 400 moves to a state-2 406. In state-2 406, a next packed byte of subcode data that includes subcode bytes T(n) through U(n+1), are written to the data buffer 220. The data written in state-2 406 may correspond, for example, to the packed byte of subcode data 330b of FIG. 4D. From state-2 406, the state machine 400 will progress to state-3 408 where the subcode byte, including V(n) through W(n+1) is written to the data buffer 220. The data written to the data buffer 220 in state-3 408 may correspond, for example, to the packed byte of subcode data 330c of FIG. 4E. From state-3 408, the state machine 400 will move back to state-0 402 where the dummy write to the data buffer 220 is performed. It should be noted that the writing of the packed bytes of subcode data 330 of FIGS. 4C through 4E will be repeated each time the state machine 400 moves to state-1 404, state-2 406, and state-3 408. Reference should also be made to FIG. 5B in which the operations performed at each state are defined such that "n" equals a subcode frame number minus 2.

In one exemplary embodiment, the format of packed subcode data may be represented as shown in Table A below. In this example, the packed subcode data R–W is written starting at an offset address of 00h. The P and Q bits are discarded, and the 96 bytes of subcode data are packed into 72 bytes as the data is written. Each group of R–W bits (i.e., 6-bits) is called a symbol. Each block contains one subcode packet (i.e., four 24 symbol packs).

TABLE A

| BYTE ADDR. | BIT ADDRESS | | | | | | | | Pack # |
|---|---|---|---|---|---|---|---|---|---|
| | Bit 7 | Bit 6 | Bit 5 | Bit 4 | Bit 3 | Bit 2 | Bit 1 | Bit 0 | |
| 00h | R0 | S0 | T0 | U0 | V0 | W0 | R1 | S1 | Pack 0 |
| * * * | * * * | * * * | * * * | * * * | * * * | * * * | * * * | * * * | |
| 11h | V22 | W22 | R23 | S23 | T23 | U23 | V23 | W23 | |
| 12h | R24 | S24 | T24 | U24 | V24 | W24 | R25 | S25 | Pack 1 |
| * * * | * * * | * * * | * * * | * * * | * * * | * * * | * * * | * * * | |
| 23h | V46 | W46 | R47 | S47 | T47 | U47 | V47 | W47 | |
| 24h | R48 | S48 | T48 | U48 | V48 | W48 | R49 | S49 | Pack 2 |
| * * * | * * * | * * * | * * * | * * * | * * * | * * * | * * * | * * * | |
| 35h | V70 | W07 | R71 | S71 | T71 | U71 | V71 | W71 | |
| 36h | R72 | S72 | T72 | U72 | V72 | W72 | R73 | S73 | Pack 3 |
| * * * | * * * | * * * | * * * | * * * | * * * | * * * | * * * | * * * | |
| 47h | V94 | W94 | R95 | S95 | T95 | U95 | V95 | W95 | |

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

At least part of the invention can also be embodied as computer readable code on a computer readable medium. The computer readable medium is any data storage device that can store data which can thereafter be read by a computer system. Examples of the computer readable medium include read-only memory, random-access memory, CD-ROMs, CD-Rs, CD-RWs, magnetic tapes, and other optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A subcode processing circuit of an optical disc drive, comprising:
    a shift register circuit for processing a plurality of standard subcode data bytes that are obtained from an optical disc media of the optical disc drive, the processing being configured to pack the plurality of standard subcode data bytes into a plurality of packed subcode data bytes;
    wherein the plurality of packed subcode data bytes is less than the plurality of standard subcode data bytes.

2. A subcode processing circuit of an optical disc drive as recited in claim 1, wherein the shift register circuit includes a plurality of shift registers.

3. A subcode processing circuit of an optical disc drive as recited in claim 2, wherein the shift register circuit includes a multiplexer that is coupled to a pair of the plurality of shift registers.

4. A subcode processing circuit of an optical disc drive as recited in claim 2, wherein the plurality of shift registers includes:
    a first 8-bit shift register;
    a second 8-bit shift register; and
    a 6-bit shift register.

5. A subcode processing circuit of an optical disc drive as recited in claim 4, further comprising:
    a multiplexer being coupled to the second 8-bit shift register and the 6-bit shift register, the multiplexer being configured to select particular subcode bits from one or both of the second 8-bit shift register and the 6-bit shift register, the selected particular subcode bits being other than P-subcode bits and Q-subcode bits, and
    wherein the selected particular subcode bits define the plurality of packed subcode data bytes.

6. A subcode processing circuit of an optical disc drive as recited in claim 5, wherein the plurality of packed subcode data bytes include subcode data bits R through subcode data bits W.

7. A subcode processing circuit of an optical disc drive as recited in claim 6, wherein for a particular sector of the optical disc media, the plurality of standard subcode data bytes include 96 subcode data bytes and the plurality of packed subcode data bytes include 72 subcode data bytes.

8. A subcode processing circuit of an optical disc drive as recited in claim 2, further comprising:
    a cyclic redundancy checksum unit for processing each one of a packed subcode data byte that is part of the plurality of packed subcode data bytes.

9. A subcode processing circuit of an optical disc drive as recited in claim 8, wherein the plurality of packed subcode data bytes include subcode data bits R through subcode data bits W, and for a particular sector of the optical disc media, the plurality of standard subcode data bytes include 96 subcode data bytes and the plurality of packed subcode data bytes include 72 subcode data bytes.

10. A subcode processing circuit of an optical disc drive as recited in claim 9, wherein the processing by the shift register circuit is controlled by a state machine.

11. A subcode processing circuit of an optical disc drive as recited in claim 1, wherein the processing by the shift register circuit is controlled by a state machine, and wherein the state machine is configured to process the plurality of standard subcode data bytes by eliminating P-subcode bits and Q-subcode bits to define the plurality of packed subcode data bytes.

12. A method for processing subcode data retrieved from a compact disc media, comprising:

receiving a plurality of standard subcode data bytes; and processing the plurality of standard subcode data bytes to generate a plurality of packed subcode data bytes, the plurality of packed subcode data bytes being fewer than the plurality of standard subcode data bytes, the processing including, examining each byte of the plurality of standard subcode data bytes to eliminate selected subcode bits; and packing remaining bytes not eliminated during the examining to define the plurality of packed subcode data bytes.

13. A method for processing subcode data retrieved from a compact disc media as recited in claim 12, wherein each byte of the plurality of standard subcode data bytes includes a P-bit, a Q-bit, an R-bit, a S-bit, a T-bit, a U-bit, a V-bit, and a W-bit, and each byte of the plurality of packed subcode data bytes does not include the P-bit and the Q-bit.

14. A method for processing subcode data retrieved from a compact disc media as recited in claim 12, wherein the examining of each byte of the plurality of standard subcode data bytes further comprises:

shifting the plurality of standard subcode data bytes through a plurality of shift registers; and selecting certain subcode bits from the plurality of standard subcode data bytes present in the plurality of shift registers, the selection being configured to eliminate the selected subcode bits.

15. A method for processing subcode data retrieved from a compact disc media as recited in claim 14, wherein each byte of the plurality of standard subcode data bytes includes a P-bit, a Q-bit, an R-bit, a S-bit, a T-bit, a U-bit, a V-bit, and a W-bit, and each byte of the plurality of packed subcode data bytes does not include the P-bit and the Q-bit.

16. A method for processing subcode data retrieved from a compact disc media as recited in claim 15, wherein the received plurality of standard subcode data bytes are associated with a given sector of the compact disc media, and the plurality of standard subcode data bytes equals 96 bytes and the plurality of packed subcode data bytes equals 72 bytes.

17. A method for processing subcode data retrieved from a compact disc media as recited in claim 12, further comprising:

error correcting each of the packed subcode data bytes just after the plurality of packed subcode data bytes are generated from the plurality of standard subcode data bytes.

18. A method for processing subcode data retrieved from a compact disc media as recited in claim 17, further comprising:

transferring the plurality of packed subcode data bytes to a host, the plurality of packed subcode data bytes only include subcode data bits R, S, T, U, V, and W for CD-TEXT processing.

19. A computer readable media having program instructions for processing subcode data retrieved from an optical disc media, comprising:

program instructions for receiving a plurality of standard subcode data bytes; and program instructions for processing the plurality of standard subcode data bytes to generate a plurality of packed subcode data bytes, the plurality of packed subcode data bytes being fewer than the plurality of standard subcode data bytes, the program instructions for processing further including, program instructions for examining each byte of the plurality of standard subcode data bytes to eliminate selected subcode bits; and program instructions for packing remaining bytes not eliminated during the examining to define the plurality of packed subcode data bytes.

20. A computer readable media having program instructions for processing subcode data retrieved from an optical disc media as recited in claim 19, wherein each byte of the plurality of standard subcode data bytes includes a P-bit, a Q-bit, an R-bit, a S-bit, a T-bit, a U-bit, a V-bit, and a W-bit, and each byte of the plurality of packed subcode data bytes does not include the P-bit and the Q-bit.

21. A computer readable media having program instructions for processing subcode data retrieved from an optical disc media as recited in claim 19, wherein the program instructions for examining of each byte of the plurality of standard subcode data bytes further comprise:

program instructions for shifting the plurality of standard subcode data bytes through a plurality of shift registers; and program instructions for selecting certain subcode bits from the plurality of standard subcode data bytes present in the plurality of shift registers, the selection being configured to eliminate the selected subcode bits.

22. A computer readable media having program instructions for processing subcode data retrieved from an optical disc media as recited in claim 19, further comprising:

program instructions for transferring the plurality of packed subcode data bytes to a host, the plurality of packed subcode data bytes only include subcode data bits R, S, T, U, V, and W for CD-TEXT processing.

* * * * *